(12) United States Patent
Kripalani et al.

(10) Patent No.: US 9,734,018 B2
(45) Date of Patent: *Aug. 15, 2017

(54) DATA STORAGE RECOVERY AUTOMATION

(71) Applicant: CommVault Systems, Inc., Tinton Falls, NJ (US)

(72) Inventors: Sanjay Harakhchand Kripalani, Morganville, NJ (US); Parag Gokhale, Morganville, NJ (US)

(73) Assignee: Commvault Systems, Inc., Tinton Falls, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/013,763

(22) Filed: Feb. 2, 2016

(65) Prior Publication Data
US 2016/0224435 A1 Aug. 4, 2016

Related U.S. Application Data

(63) Continuation of application No. 13/788,846, filed on Mar. 7, 2013, now Pat. No. 9,286,327.

(60) Provisional application No. 61/618,579, filed on Mar. 30, 2012.

(51) Int. Cl.
*G06F 17/30* (2006.01)
*G06F 11/14* (2006.01)
*G06F 9/445* (2006.01)
*H04L 29/08* (2006.01)

(52) U.S. Cl.
CPC .......... *G06F 11/1464* (2013.01); *G06F 8/61* (2013.01); *G06F 11/1456* (2013.01); *G06F 11/1469* (2013.01); *G06F 17/30289* (2013.01); *H04L 67/1097* (2013.01); *G06F 2201/84* (2013.01)

(58) Field of Classification Search
None
See application file for complete search history.

(56) References Cited

U.S. PATENT DOCUMENTS

| 4,084,231 A | 4/1978 | Capozzi et al. |
| 4,267,568 A | 5/1981 | Dechant et al. |
| 4,283,787 A | 8/1981 | Chambers |

(Continued)

FOREIGN PATENT DOCUMENTS

| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.

(Continued)

*Primary Examiner* — Debbie Le
(74) *Attorney, Agent, or Firm* — Knobbe, Martens, Olson & Bear, LLP

(57) ABSTRACT

According to certain aspects, systems and methods are provided for automating recovery of a networked data storage environment. For instance, a system can generate a data recovery package configured to automatically carry out a process for recovering a data storage environment and/or associated data. The content of the particular workflow depends on the data storage environment, and can be defined by a user.

20 Claims, 10 Drawing Sheets

(56) References Cited

U.S. PATENT DOCUMENTS

| | | |
|---|---|---|
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,707,299 B2 * | 4/2010 | Pagan .................. H04L 67/104 370/390 |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,170,995 B2 | 5/2012 | Prahlad et al. |
| 8,229,954 B2 | 7/2012 | Kottomtharayil et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,533,699 B2 | 9/2013 | Moir et al. |
| 8,578,120 B2 | 11/2013 | Attarde et al. |
| 8,600,945 B1 * | 12/2013 | Natanzon ............... G06F 17/00 707/648 |
| 9,069,799 B2 | 6/2015 | Vijayan |
| 9,286,327 B2 * | 3/2016 | Kripalani .......... G06F 17/30289 |
| 2006/0224846 A1 | 10/2006 | Amarendran et al. |
| 2006/0271916 A1 | 11/2006 | Abe |
| 2009/0106327 A1 * | 4/2009 | Dilman ............... G06F 11/0727 |
| 2009/0319534 A1 | 12/2009 | Gokhale |
| 2011/0016093 A1 | 1/2011 | Clark |
| 2012/0150818 A1 | 6/2012 | Vijayan Retnamma et al. |
| 2012/0150826 A1 | 6/2012 | Vijayan Retnamma et al. |
| 2012/0254846 A1 | 10/2012 | Moir et al. |
| 2013/0262396 A1 | 10/2013 | Kripalani et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

* cited by examiner

DATA STORAGE RECOVERY AUTOMATION

CROSS REFERENCE TO RELATED APPLICATIONS

This application is a continuation of U.S. patent application Ser. No. 13/788,846, filed on Mar. 7, 2013, entitled DATA STORAGE RECOVERY AUTOMATION, which claims the benefit of priority under 35 U.S.C. §119(e) to U.S. Provisional Patent Application No. 61/618,579, filed on Mar. 30, 2012, entitled DATA STORAGE RECOVERY AUTOMATION, each of which is incorporated herein by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

In view of the above, companies often create copies of production data, and access the copies for recovery purposes. The recovery copies can be accessed in the event that one or more components in the data storage environment fail or otherwise become unavailable, such as in the event of a natural disaster or other scenario. For instance, the data may be copied to a recovery site that is remote from the production site or data center.

In addition to recovering the data, it is often also desirable to recover the data storage environment itself or portions thereof. Thus, in accordance with certain embodiments, the data storage system maintains copies of metadata or other information representing aspects of the data storage environment. This information can include, for example, the number and type of components in the environment, the topology of the data storage environment or portions thereof, configuration parameters associated with the data storage environment, and the like. Then, the recovery information can be used to rebuild the data storage environment and/or recovery data. The process can be used not only to recover from a disaster or other event, but for other purposes, such as for testing or compliance.

Given the complexity of modern data storage systems, the recovery process can often be correspondingly complex and time consuming. For instance, a system administrator or other employee may be sent to a recovery site to manually carry out the numerous steps involved in recovering the data. And the administrator may manually enter commands for, without limitation, accessing recovery copies, installing and configuring data storage components, programs, file systems, recovering and restoring data, etc. Depending on the size and complexity of the data storage environment, this process can be time consuming and inefficient. Moreover, in order to successfully implement recovery, the administrator often has a relatively high level of expertise and familiarity with the subject data storage system.

Thus, according to certain aspects, systems and methods are provided for automating recovery of a networked data storage environment. For instance, a system can generate a data recovery package configured to automatically carry out an automation workflow for recovering a data storage environment and/or associated data. The content of the particular workflow depends on the data storage environment, and can be defined by a user.

A data storage environment can exist on a first set of computer hardware devices, for example. The automation package can be configured, upon execution, to cause at least a portion of a source data storage environment and/or associated data at a production site to be replicated onto another set of computer hardware devices located, for example, at a recovery site that is remote from the production site.

In some embodiments, an interface is provided allowing a user to construct a pre-configured recovery flow. The interface can be a graphical user interface (GUI) including intuitive drag and drop functionality, for example. For instance, the interface can display a set of icons representative of corresponding operations and associated with underlying executable instructions. The user can select icons for inclusion in the automation process, and the system can then generate the recovery package based on the user-constructed automation flow. In some cases, the same or a similar GUI can also be used to execute the recovery package. In some cases, multiple recovery packages are generated. For instance, the user may wish to create several automation packages, each of which is intended to perform targeted, automated recovery of different portions of the data storage environment. Or separate automation packages may be created for each of a plurality data storage environments (e.g., multiple production sites). Each recovery automation package can be stored as a separate file, selectable for execution using the automation interface.

According to certain embodiments, a method is provided for automating recovery of a networked data storage environment. The method includes receiving an indication of user selection of a plurality of commands for inclusion in a data storage recovery automation package. The method further includes generating, at a first point in time and by a first computing device, the automated data recovery package, the recovery automation package configured, upon execution, to recover at least a portion of a data storage environment implemented on a first set of computer hardware devices to a second set of computer hardware devices that is remote from the first set of computer hardware devices. The method also includes storing the automated recovery package on first storage. The automated data recovery package is, at a second point in time later than the first point in time, accessed from the first storage and invoked for execution on a second computing device that is remote from the first computing device. Execution of the data recovery package causes automatic execution the plurality of commands to completion.

According to certain embodiments, a computer system is provided including one or more first computer processors and first storage media having a database stored thereon which includes a set of recovery automation commands. The computer system includes a recovery automation interface executing in the one or more first computer processors and configured to receive an indications of user selection of a plurality of the recovery automation commands for inclusion in an automated recovery process in which at least a portion of a data storage environment implemented on a first set of computer hardware devices is recovered on a second set of computer hardware devices that is remote from the first set of computer hardware devices. The system further includes a recovery automation module executing in the one or more computer processors and configured to generate, at a first point in time, an automated data recovery package comprising a representation of the selected commands. The automated data recovery package is, at a second point in time later than the first point in time, accessed from storage media and invoked for execution on one or more second computer processors that are remote from the one or more first computer processors. Execution of the data recovery package causes automatic execution the plurality of commands to completion.

According to another aspect of the disclosure, a method of automating recovery of a data storage environment. The method includes receiving an indication of user selection of a plurality of commands for inclusion in a recovery automation package, the recovery automation package configured, upon execution, to recover at least a portion of a data storage environment implemented on a first set of computer hardware devices. The method also includes generating, at a first point in time and by a first computing device, an automated data recovery package comprising a representation of the selected commands. The method includes storing the automated recovery package on first storage. The automated data recovery package is, at a second point in time later than the first point in time, accessed from the first storage and invoked for execution. Execution of the data recovery package causes automatic execution the plurality of commands.

According to yet another aspect of the disclosure, a method of performing automated recovery of a data storage system. The method includes accessing, from storage media, and using one or more processors, a data recovery automation package comprising a plurality of commands for recovering at least a portion of a data storage environment implemented on a first set of one or more computer hardware devices, the data recovery automation package generated at a first point in time earlier than a second point in time at which said accessing occurs. The method also includes automatically performing, using one or more computer processors, a first command of the plurality of commands by installing a first data storage component that was installed on at least one computing device in the first set of computer hardware devices on at least one computing device in a second set of one or more computer hardware devices. The method further includes automatically performing, using one or more computer processors, a second command of the plurality of commands by using the first data storage component to copy at least a portion of a data store onto one or more storage devices in the second set of one or more computer hardware devices, the data store including production data generated by at least one application running on at least one client computing device in the first set of one or more computer hardware devices.

DETAILED DESCRIPTION

Systems and methods are described herein for implementing recovery of data in a data storage system. Examples of such systems and methods are discussed in further detail herein, e.g., with respect to FIGS. 2-5. Data recovery (e.g., automated disaster recovery) may additionally be implemented by information management systems such as those that will now be described with respect to FIGS. 1A-1E. And, as will be described, the componentry for implementing the data recovery techniques described herein can be incorporated into and implemented by such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
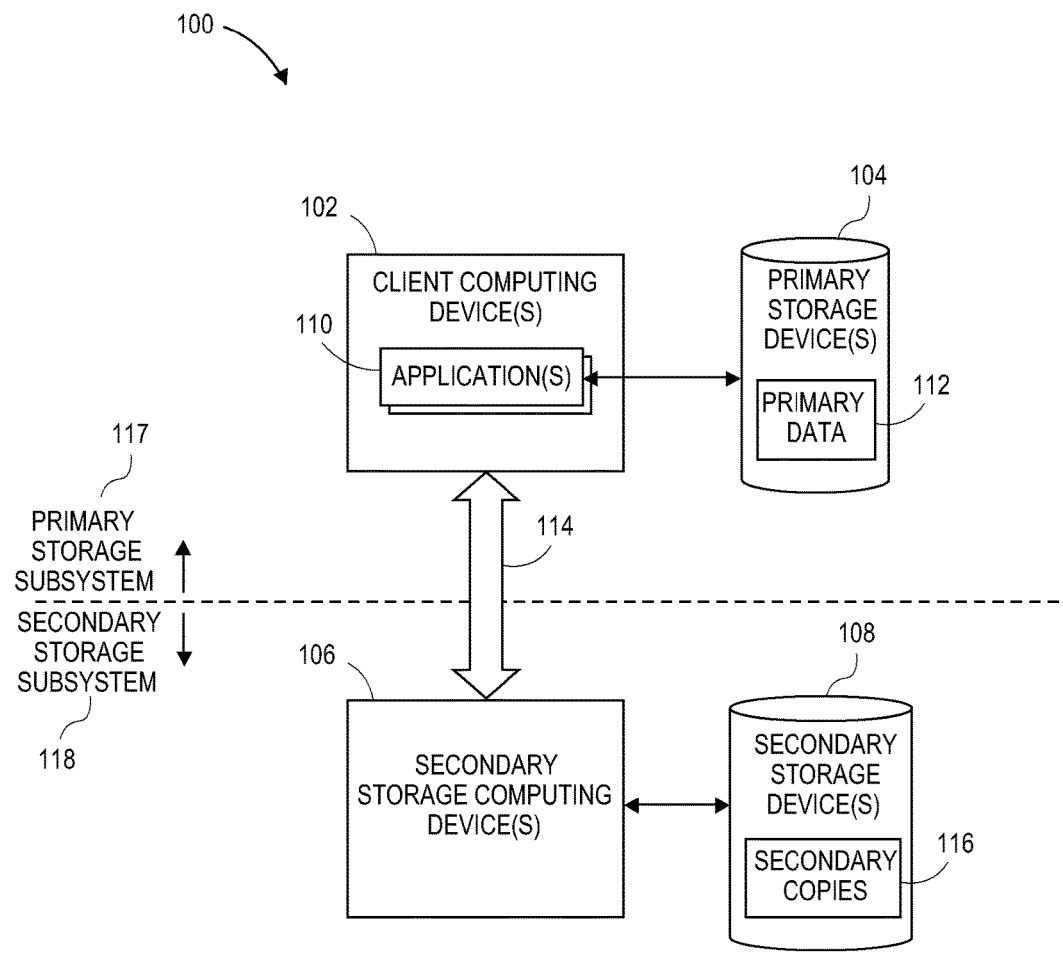
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
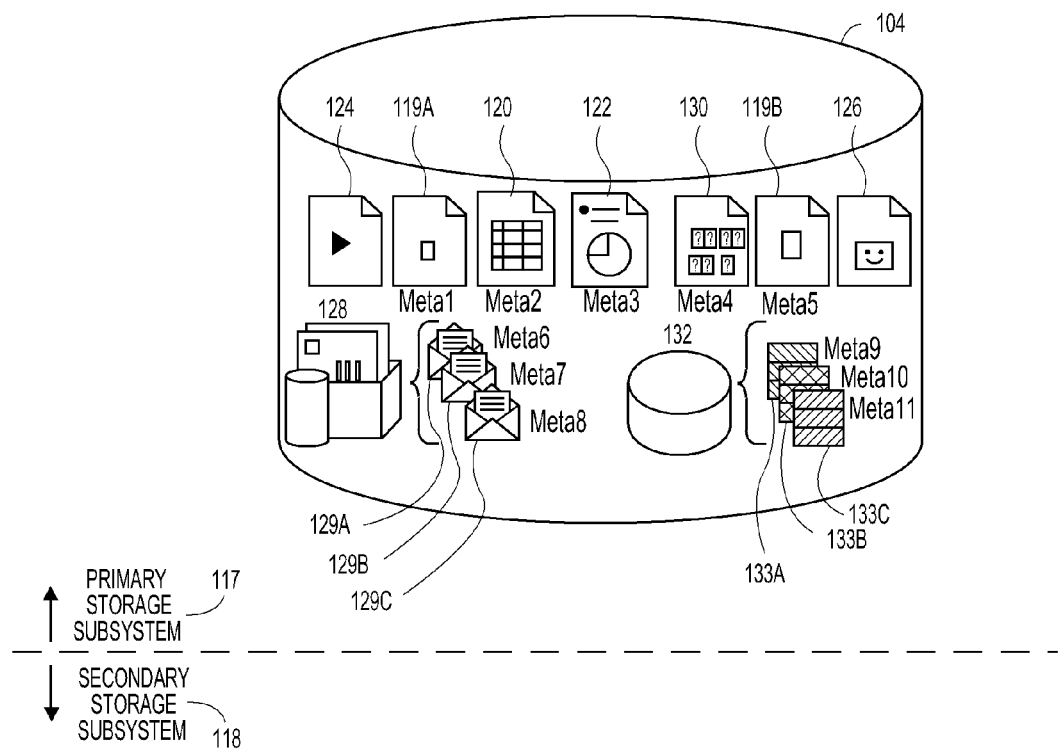
FIG. 1B is a detailed view of a primary storage device, a secondary storage device, and some examples of primary data and secondary copy data.
Figure 1B:
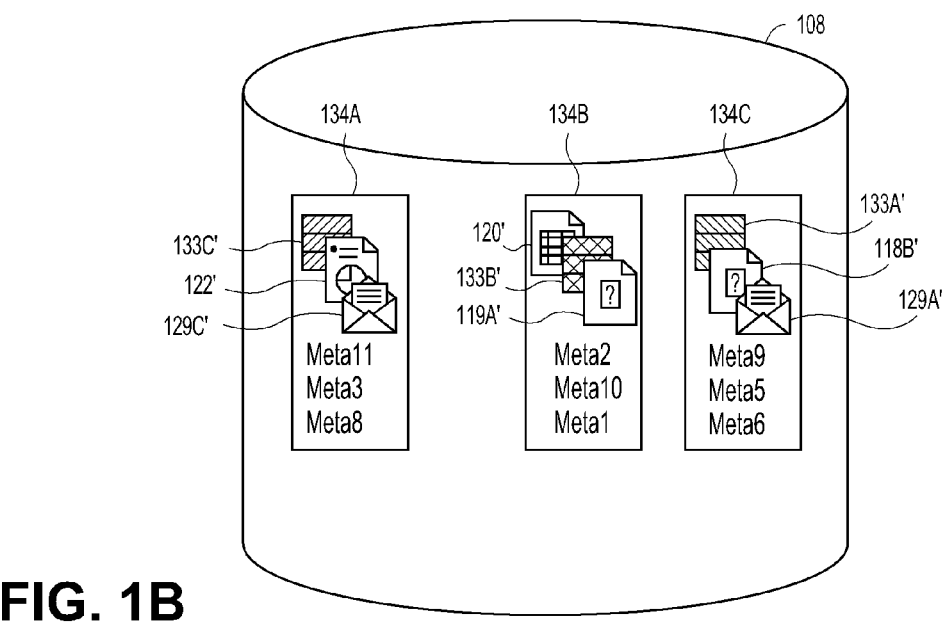

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
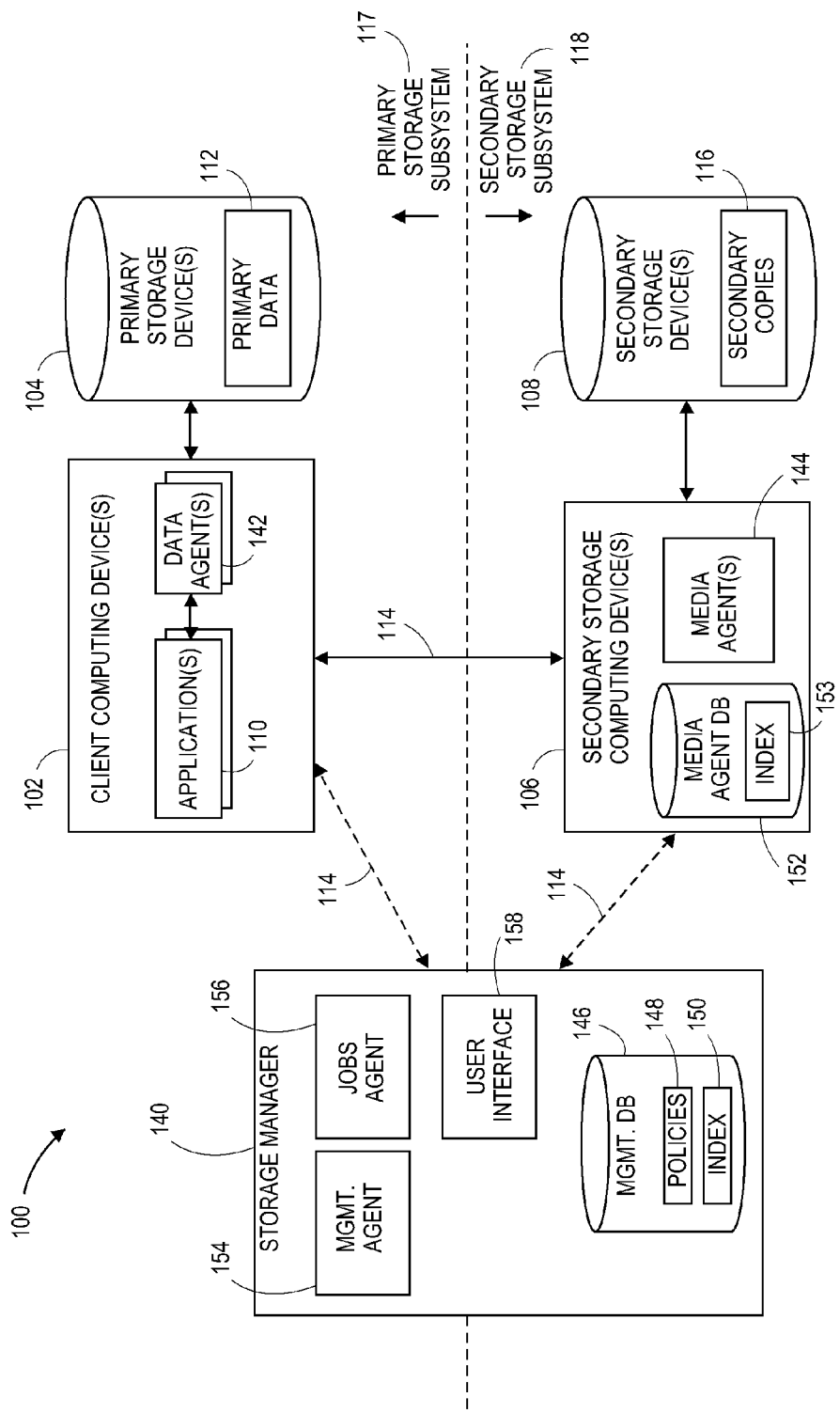
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
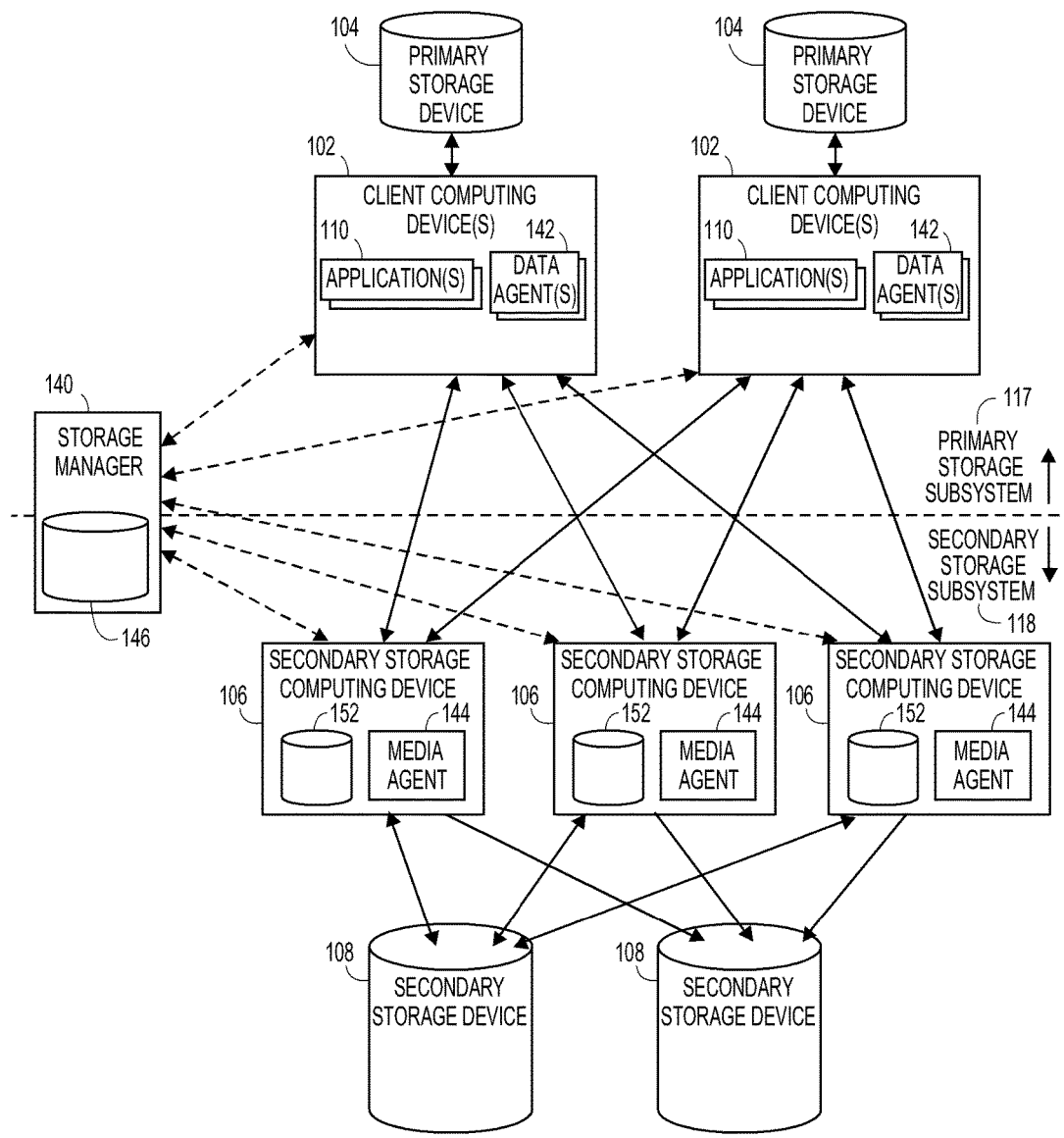
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having predefined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;

access control lists or other security information; and
the content of a particular data object (e.g., its textual content) or of metadata associated with the data object.

Exemplary Storage Policy and Secondary Storage Operations

Figure 1E:
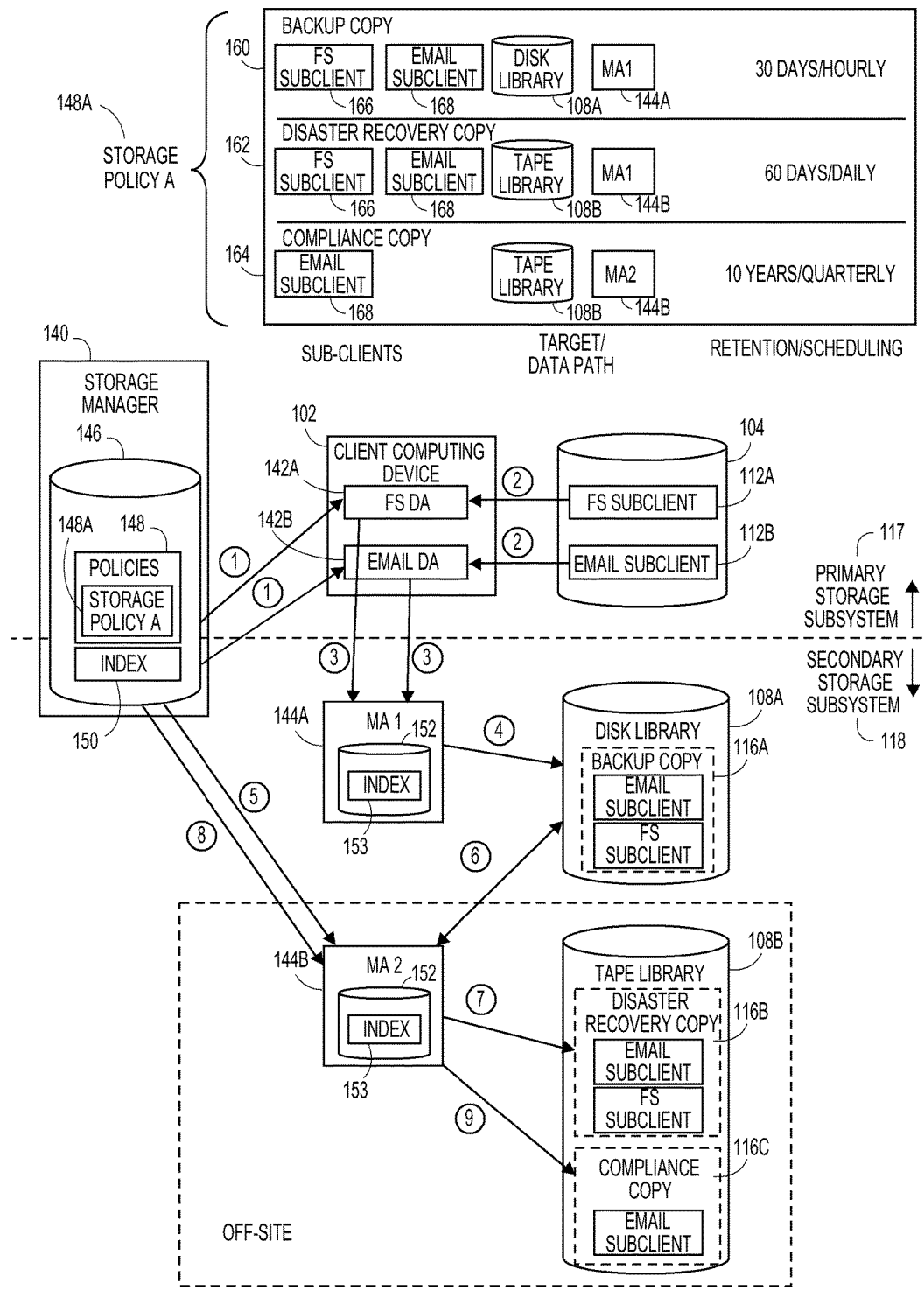
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Data Recovery Automation

Figure 2:
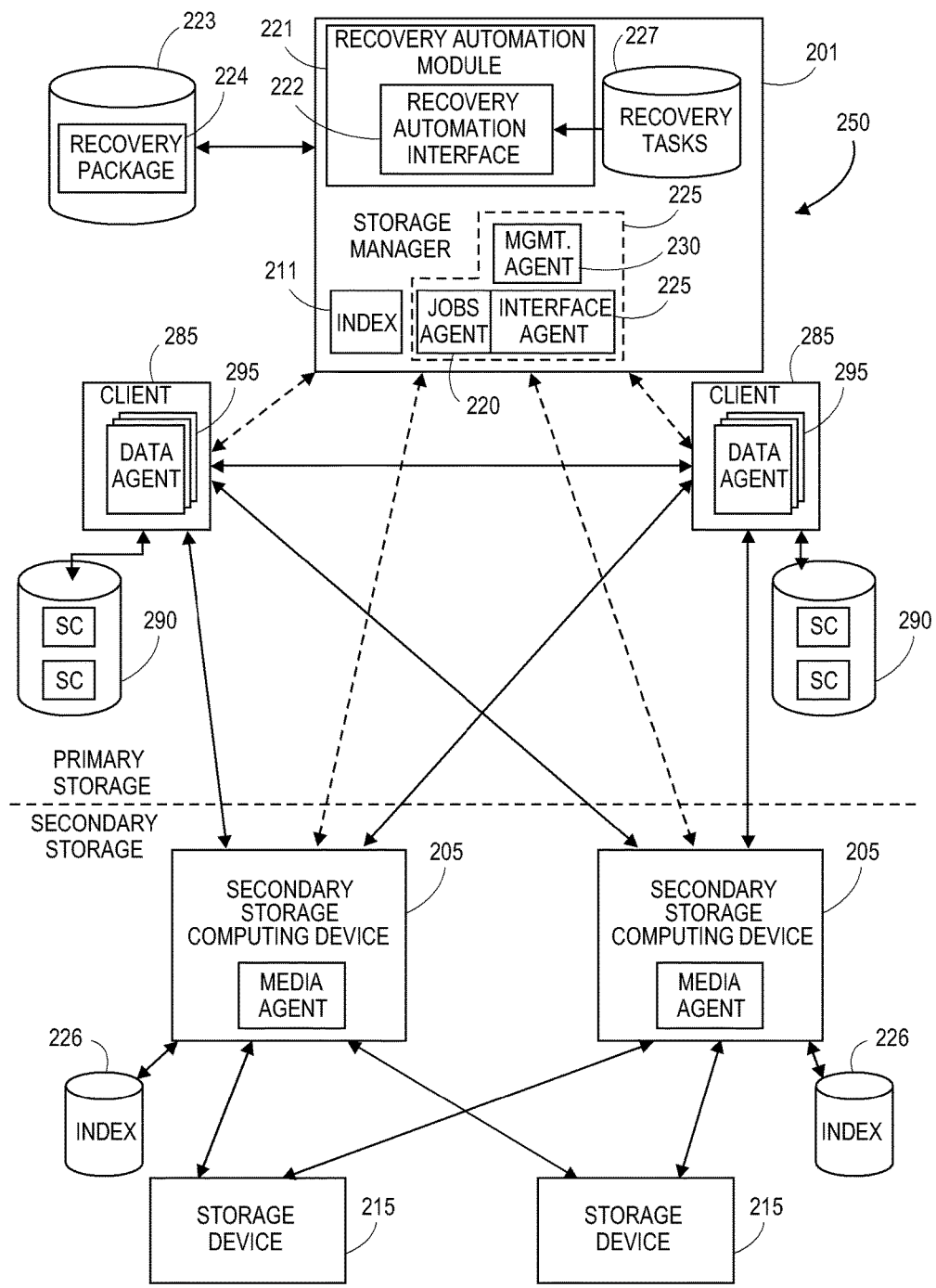
FIG. 2 is a block diagram of an example storage system configured to implement automated data storage recovery.

FIG. 2 is a block diagram illustrating an example arrangement of resources in a data storage environment. As shown, the data storage system 250 may generally include a storage manager 201, a data agent 295, a media agent 205, a storage device 215, and, in some embodiments, may include certain other components such as a client 285, a data or information store 290, database or index 211, jobs agent 220, an interface module 225, and a management agent 230. Such a system and elements thereof are exemplary of a modular storage system such as the CommVault Simpana system available from CommVault Systems, Inc. of Oceanport, N.J., and further described in U.S. patent application Ser. No. 09/610,738, now U.S. Pat. No. 7,035,880, which is incorporated herein by reference, in its entirety.

A data storage system, such as the system 250, may generally include combinations of hardware and software components associated with performing storage operations on electronic data. According to some embodiments of the present disclosure, storage system 250 may be related to data storage cells and provide some or all of the functionality of data storage cells as described in U.S. patent application Ser. No. 09/354,058, now U.S. Pat. No. 7,395,282 which is hereby incorporated by reference in its entirety.

As shown, the data storage system 250 can include a recovery automation module 221 including a recovery automation interface 222. The recovery automation module 221 can be configured to generate a recovery automation package 224, which can be stored on storage media 223. For instance, a user may interact with the recovery automation interface 222 to construct a recovery automation workflow for recovery of the data storage system 250 or portions thereof and/or production data associated with the data storage system or portions thereof. The contents of the automation package 224 will vary depending on the contents of the user-constructed workflow.

The recovery automation module 221 may be a software module or part of a software module that is generally responsible for generating the recovery package 224. As shown, the recovery automation module 221 may form a part of the storage manager 201. In other embodiments, the recovery automation module 221 is separate from the storage manager 201. In one case, the recovery automation module 223 resides on the same computing device as the storage manager 201, but forms a separate software module.

The recovery automation interface 222 may include information processing and display software, such as a graphical user interface ("GUI") (not shown). Through the recovery automation interface 222, users can construct a recovery workflow. In some cases, the automation interface 222 allows the user to initiate execution of one or more pre-defined recovery packages. For instance, the user may use the automation interface 222 of a first instance recovery automation module 222 to create one or more recovery packages at a first point in time, e.g., at the production site. And, at a second point in time, the user can install a second instance of the recovery automation module 223, also including the automation interface 222, e.g., at the recovery site. The interface 222 additionally provides the user with the ability to execute and/or edit the pre-configured automation packages to implement the desired recovery operations.

For instance, the recovery automation module 221 may maintain or have access to a set of pre-configured tasks or activities that can be optionally included in the recovery package 224. Code segments or sets of instructions associated with the pre-configured tasks can be stored on media that is accessible by the recovery automation module 221. For instance, code segments, sets of instructions, or other information sufficient to implement the pre-configured automation tasks can be contained in the database 227. The database 227 is stored on one or more storage devices coupled to the computing device on which the automation module 222 and/or storage manager 201 reside, for example. The code segments or instructions can be scripts written in Extensible Markup Language (XML), Perl, Java, or any other appropriate scripting or programming language. In some cases, the instructions comprise executable instructions. As just a few examples, the activities can include commands to install particular software modules and programs (e.g., media agents, storage managers, data agents, database applications or other software applications, file systems, etc.), recover and restore data (e.g., restore a database such as an or other SQL database, restore a file system, etc.). In some embodiments, the automation module 221 provides the user with the ability to create their own, customized automation tasks. For instance, the user can create automation tasks for implementing customer-specific functional testing, data validation, or other customized operations. These and other tasks are discussed in further detail herein, with respect to FIGS. 3A-5, for example.

Via the automation interface 222, the user can select one or more of the pre-configured tasks for inclusion in the particular customized recovery flow. For instance, the automation interface 222 can display a set of icons that are each associated with a particular task. In some embodiments, the interface 222 includes a "drag-and-drop" type interface, where the user can select desired icons and move them to a particular area of the display to create a customized recovery flow. In such cases, the user can further define the order and/or relationship between the different tasks by placing the icons in proper relation to one another on the display. For instance, one or more connectors, arrows or other control constructs can be used to relate the icons to one another and/or define the order that the corresponding tasks will be executed. Other mechanisms can be used instead of, or in addition to a drag-and-drop interface. For instance, the user may double click on an icon, text, or other information associated with a particular task to include that task in the recovery flow.

The recovery package 224 can generally include an executable representation of the user-defined data storage recovery flow. For instance, the recovery automation module 221 accesses the code segments (or other appropriate type of data) corresponding to the selected recovery tasks from the database 227. Then the automation module 221 assembles the code segments together to create the recovery package 224. As one example, the code segments or other data are assembled in a list, in the defined order of execution. In some cases, the code segments or other data are stored in a file associated with the particular recovery package 224 (e.g., and XML file). When the data recovery package 224 is later invoked, execution of the package 224 implements the automated recovery flow. The recovery package 224 is discussed in further detail herein (e.g., with respect to FIGS. 3A-5).

The storage media 223 on which the recovery package 224 is stored can generally include any appropriate type of media, such as solid state memory, magnetic memory (e.g., a spinning hard-drive), optical media (e.g., a DVD), etc. In some cases, the media 223 is remote from the storage system 250 and/or portable (e.g, a thumb-drive) so that the recovery package 224 can be accessed in the event of a disaster or other event in which components in the data storage system 250 become unavailable. In some cases, the recovery package is initially stored local to the data storage system 250, and is then copied or moved to different storage media that is remote from the storage system 250. In one embodiment, a copy of the recovery package 224 is maintained in cloud storage, or is automatically transmitted to one or more recovery sites (not shown) for remote storage. In some cases, the recovery package 224 is stored on one or more of the other storage devices in the data storage system 250, such as one or more of the storage devices 215 coupled to the media agents 205, or one or more storage devices associated with the storage manager 201 or client(s).

As mentioned, the automated recovery process can restore data associated with the data storage system 250, portions of the data storage system 250 itself, or both.

The data recovered during the automated recovery process may include production data generated by one or more of the clients 285, such as data stored in one or more of the information stores 290 (e.g., primary copies of production data), or data stored in the storage devices 215 (e.g., secondary copies of production data). For example, the recovery package 224 can be used to recovery primary copies, backup copies, snapshot copies, replication copies, auxiliary copies, or the like. Examples of compatible replication techniques are included in U.S. patent application Ser. No. 11/640,829, now U.S. Pat. No. 7,617,262, which is hereby incorporated by reference in its entirety.

In some embodiments, one or more secondary copies of data are used as source data in the recovery process. For instance, one or more of the storage devices 215 may be remote from other components in the data storage system 250, such as one or more of the storage manager 201, clients 285, media agents 205, information stores 290 and/or other components. And the secondary copies on the remote storage devices 215 can be accessed directly during the recovery process, serving as a recovery data source.

In other embodiments, one or more other remote storage device(s) contains the data used in the recovery process. As one example, the data storage system 250 may create one or more auxiliary copies of secondary copies (e.g., secondary copies stored in the storage devices 215), and store the auxiliary copies in one or more off-site storage devices (not shown), which are accessed during recovery.

In yet other cases, the data used in the recovery process is derived directly from primary production data (e.g., primary data stored in one or more of the client information stores 290). For instance, primary production data, rather than secondary copies, may be copied to remote storage to create one or more recovery copies that usable in the recovery process.

The portions of the data storage system 250 recovered as part of the automated recovery process can include the storage manager 201 or portions thereof, such as the index 211, one or more of the clients 285 or portions thereof, such as particular data agents 295 or information stores 290, and one or more of the media agents 205 or portions thereof. For instance, the recovery package 224 can include commands for installing software modules corresponding to these components. In addition, the recovery package 224 can include recovery metadata such as a set of configuration parameters associated with components in the data storage system 250. The recovery metadata can be used during the recovery process to configure the various recovered components properly.

Further aspects of the automated recovery process are described below, such as with respect to FIGS. 3A-5.

In accordance with certain embodiments of the present disclosure, additional storage operations performed by storage systems may include creating, storing, retrieving, and migrating primary storage data (e.g., 290) and secondary storage data (which may include, for example, snapshot copies, backup copies, HSM copies, archive copies, and other types of copies of electronic data) stored on storage devices 215. In some embodiments, storage systems may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. Exemplary storage policies are described above, and in some embodiments, a storage policy can be any of the storage policies described above with respect to FIGS. 1C-E. A storage policy can be a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, other criteria relating to a storage operation, combinations of the same and the like. Thus, in certain embodiments, a storage policy may indicate that certain data is to be stored in a specific storage device, retained for a specified period of time before being aged to another tier of secondary storage, copied to secondary storage using a specified number of streams. A storage policy may be stored in the storage manager database 211, to archive media as metadata for use in restore operations or other storage operations, or to other locations or components of the system.

In certain embodiments, a schedule policy may specify when to perform storage operations and how often and may also specify performing certain storage operations on sub-clients of data and how to treat those sub-clients. A sub-client may represent static or dynamic associations of portions of data of a volume and are typically mutually exclusive. Thus, in certain embodiments, a portion of data may be given a label and the association is stored as a static entity in an index, database or other storage location used by the system. Sub-clients may also be used as an effective administrative scheme of organizing data according to data type, department within the enterprise, storage preferences, combinations of the same or the like. Other example sub-clients are described above.

For example, an administrator may find it preferable to separate e-mail data from financial data using two different sub-clients having different storage preferences, retention criteria, or the like. Storage systems may contain not only physical devices, but also may represent logical concepts, organizations, and hierarchies. For example, a first storage system 250 may be configured to perform a first type of storage operations such as HSM operations, which may include backup or other types of data migration, and may include a variety of physical components including the storage manager 201 (or management agent 230), the media agent 205, the client component 285, and other components as described herein. A second storage system, or cell may contain the same or similar physical components, however, it may be configured to perform a second type of storage operations such as SRM operations, and may include as monitoring a primary data copy or performing other known SRM operations.

Thus, as can be seen from the above, although the first and second storage cells are logically distinct entities configured to perform different management functions (i.e., HSM and SRM respectively), each cell may contain the same or similar physical devices. Alternatively, in other embodiments, different storage cells may contain some of the same physical devices and not others. For example, a storage system configured to perform SRM tasks may contain the media agent 205, client 285, or other network device connected to a primary storage volume, while a storage cell configured to perform HSM tasks may instead include a media agent 205, client 285, or other network device connected to a secondary storage volume and not contain the elements or components associated with and including the primary storage volume. These two cells, however, may each include a different storage manager that coordinates storage operations via the same media agents 205 and storage devices 215. This "overlapping" configuration allows storage resources to be accessed by more than one storage manager 201 such that multiple paths exist to each storage device 215 facilitating failover, load balancing and promoting robust data access via alternative routes.

Alternatively, in some embodiments, the same storage manager 201 may control two or more cells (whether or not each storage cell has its own dedicated storage manager). Moreover, in certain embodiments, the extent or type of overlap may be user-defined (e.g., through a control console) or may be automatically configured to optimize data storage and/or retrieval.

Data agent 295 may be the same or similar to the data agents 142 described with respect to FIGS. 1C-1E, and may be a software module or part of a software module that is generally responsible for copying, archiving, migrating, and recovering data from client computer 285 stored in an information store 290 or other memory location. Each client computer 285 may have at least one data agent 295 and the system can support multiple client computers 285. In some embodiments, data agents 295 may be distributed between client 285 and storage manager 201 (and any other intermediate components) or may be deployed from a remote location or its functions approximated by a remote process that performs some or all of the functions of data agent 295.

Embodiments of the present disclosure may employ multiple data agents 295 each of which may backup, migrate, and recover data associated with a different application. For example, different individual data agents 295 may be designed to handle Microsoft Exchange data, Lotus Notes data, Microsoft Windows file system data, Microsoft Active Directory Objects data, and other types of data. Other embodiments may employ one or more generic data agents 295 that can handle and process multiple data types rather than using the specialized data agents described above.

If a client computer 285 has two or more types of data, one data agent 295 may be required for each data type to copy, archive, migrate, and restore the client computer 285 data. For example, to backup, migrate, and restore all of the data on a Microsoft Exchange server, the client computer 285 may use one Microsoft Exchange Mailbox data agent 295 to backup the Exchange mailboxes, one Microsoft Exchange Database data agent 295 to backup the Exchange databases, one Microsoft Exchange Public Folder data agent 295 to backup the Exchange Public Folders, and one Microsoft Windows File System data agent 295 to backup the client computers 285 file system. In such embodiments, these data agents 295 may be treated as four separate data agents 295 by the system even though they reside on the same client computer 285.

Alternatively, other embodiments may use one or more generic data agents 295, each of which may be capable of handling two or more data types. For example, one generic data agent 295 may be used to back up, migrate and restore Microsoft Exchange 2000 Mailbox data and Microsoft Exchange 2000 Database data while another generic data agent may handle Microsoft Exchange 2000 Public Folder data and Microsoft Windows 2000 File System data, or the like.

Data agents 295 may be responsible for arranging or packing data to be copied or migrated into a certain format such as an archive file. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents may be tracked within the system by updating indexes associated appropriate storage managers or media agents.

Generally speaking, storage manager 201 may be the same or similar to the storage managers 140 described with respect to FIGS. 1C-1E, and can be a software module or other application that coordinates and controls storage operations performed by storage system 250. Storage manager 201 may communicate with some or all elements of storage system 250 including client computers 285, data agents 295, media agents 205, and storage devices 215, to initiate and manage system backups, migrations, and data recovery.

Storage manager 201 may include a jobs agent 220 that monitors the status of some or all storage operations previously performed, currently being performed, or scheduled to be performed by storage operation cell 250. Jobs agent 220 may be communicatively coupled with an interface agent 225 (typically a software module or application). Interface agent 225 may include information processing and display software, such as a graphical user interface ("GUI"), an application program interface ("API"), or other interactive interface through which users and system processes can retrieve information about the status of storage operations. Through interface 225, users may optionally issue instructions to various storage systems 250 regarding performance of the storage operations as described and contemplated by the present disclosure. For example, a user may modify a schedule concerning the number of pending snapshot copies or other types of copies scheduled as needed to suit particular needs or requirements. As another example, a user may employ the GUI to view the status of pending storage operations in some or all of the storage cells in a given network or to monitor the status of certain components in a particular storage cell (e.g., the amount of storage capacity left in a particular storage device).

Storage manager 201 may also include a management agent 230 that is typically implemented as a software module or application program. In general, management agent 230 provides an interface that allows various management components 201 in other storage operation cells 250 to communicate with one another. For example, assume a certain network configuration includes multiple cells 250 adjacent to one another or otherwise logically related in a WAN or LAN configuration (not shown). With this arrangement, each cell 250 may be connected to the other through each respective interface agent 225. This allows each cell 250 to send and receive certain pertinent information from other cells 250 including status information, routing information, information regarding capacity and utilization, or the like. These communication paths may also be used to convey information and instructions regarding storage operations.

For example, a management agent in a first storage cell may communicate with a management agent in a second storage cell regarding the status of storage operations in the second storage cell. Another illustrative example includes the case where a management agent in first storage cell communicates with a management agent 230 in a second storage cell to control the storage manager 201 (and other components) of the second storage cell via the management agent 230 contained in the storage manager 201.

Another illustrative example is the case where management agent 230 in the first storage cell 250 communicates directly with and controls the components in the second storage cell 250 and bypasses the storage manager 201 in the second storage cell. If desired, storage cells 250 can also be organized hierarchically such that hierarchically superior cells control or pass information to hierarchically subordinate cells or vice versa.

Storage manager 201 may also maintain an index, a database, or other data structure 211. The data stored in database 211 may be used to indicate logical associations between components of the system, user preferences, management tasks, media containerization and data storage information or other useful data, as described in greater detail in application Ser. No. 10/818,749, now U.S. Pat. No. 7,246,207, herein incorporated by reference in its entirety. For example, the storage manager 201 may use data from database 211 to track logical associations between media agent 205 and storage devices 215 (or movement of data as containerized from primary to secondary storage). In addition, to the index 211, the storage system 250 can also include one or more indexes as part of the media agent 270.

A media agent 105 may be the same or similar to the media agents 144 described with respect to FIGS. 1C-1E. A media agent 105 may also be referred to as or be implemented on a secondary storage computing device 205, may be implemented as software module that conveys data, as directed by storage manager 201, between a client computer 285 and one or more storage devices 215 such as a tape library, a magnetic media storage device, an optical media storage device, solid state media, or any other suitable storage device. In one embodiment, secondary computing device 205 may be communicatively coupled with and control a storage device 215. A secondary computing device 205 may be considered to be associated with a particular storage device 215 if that secondary computing device 205 is capable of routing and storing data to particular storage device 215.

In operation, a secondary computing device 205 associated with a particular storage device 215 may instruct the storage device to use a robotic arm or other retrieval means to load or eject a certain storage media, and to subsequently archive, migrate, or restore data to or from that media. Secondary computing device 205 may communicate with a storage device 215 via a suitable communications path such as a SCSI or fiber channel communications link. In some embodiments, the storage device 215 may be communicatively coupled to a data agent 205 via a storage area network ("SAN"). As shown, in certain embodiments, each client 285 can communicate with any of the secondary storage computing devices 205, e.g., as directed by the storage manager. Moreover, each secondary storage device 205 can communicate with any of the secondary storage devices 215, e.g., as directed by the storage manager. Thus, storage operations can be routed to the storage devices 215 in a dynamic and flexible manner. This inter-networked configuration provides both scalability and efficient component utilization. Further compatible examples of dynamic storage operations are provided in application Ser. No. 10/818,749, now U.S. Pat. No. 7,246,207.

Each secondary storage computing device 205 may maintain an index 226, a database, or other data structure 226 which may store index data generated during backup, migration, and restore and other storage operations as described herein. For example, performing storage operations on Microsoft Exchange data may generate index data. Such index data provides a secondary computing device 205 or other external device with a fast and efficient mechanism for locating data stored or backed up. Thus, in some embodiments, a secondary storage computing device index 226, or a storage manager database 211, may store data associating a client 285 with a particular secondary computing device 205 or storage device 215, for example, as specified in a storage policy, while a database or other data structure in secondary computing device 205 may indicate where specifically the client 285 data is stored in storage device 215, what specific files were stored, and other information associated with storage of client 285 data. In some embodiments, such index data may be stored along with the data backed up in a storage device 215, with an additional copy of the index data written to index cache in a secondary storage device. Thus the data is readily available for use in storage operations and other activities without having to be first retrieved from the storage device 215.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 215. In some embodiments, the cached information may include information regarding format or containerization of archive or other files stored on storage device 215.

In some embodiments, certain components may reside and execute on the same computer. For example, in some embodiments, a client computer 285, such as a data agent 295 or a storage manager 201, coordinates and directs local archiving, migration, and retrieval application functions as further described in U.S. patent application Ser. No. 09/610, 738. This client computer 285 can function independently or together with other similar client computers 285.

Furthermore, components of the storage system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, any other networks described herein, combinations of the same or the like.

Additionally, the various components of FIG. 2 may be configured for deduplication. For example, one or more of the clients 285 can include a deduplicated database. The data stored in the storage devices 215 or storage devices 290 may also be deduplicated. For example, one or more of the media agents 260 associated with the respective storage devices 280 can manage the deduplication of data in the storage devices 215.

The storage system 250 can perform various types of storage operations, such as, for example, replication, snap-shots, archiving and the like. A description of some storage operations compatible with embodiments described herein is provided near the end of this disclosure.

Example Recovery Automation Process

Figure 3A:
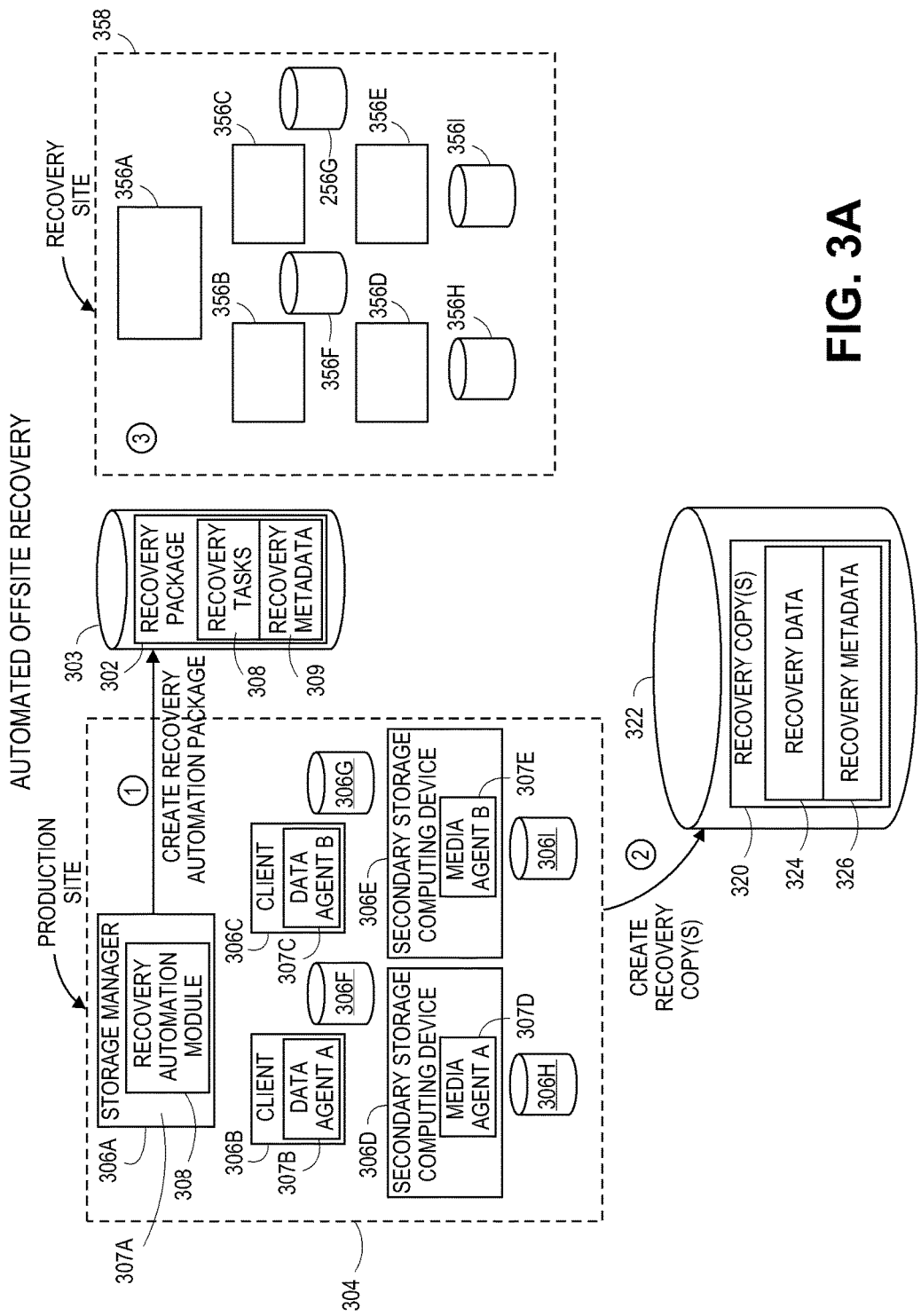
FIGS. 3A-3C illustrate the generation and execution of a recovery automation package according to certain embodiments.
Figure 3B:
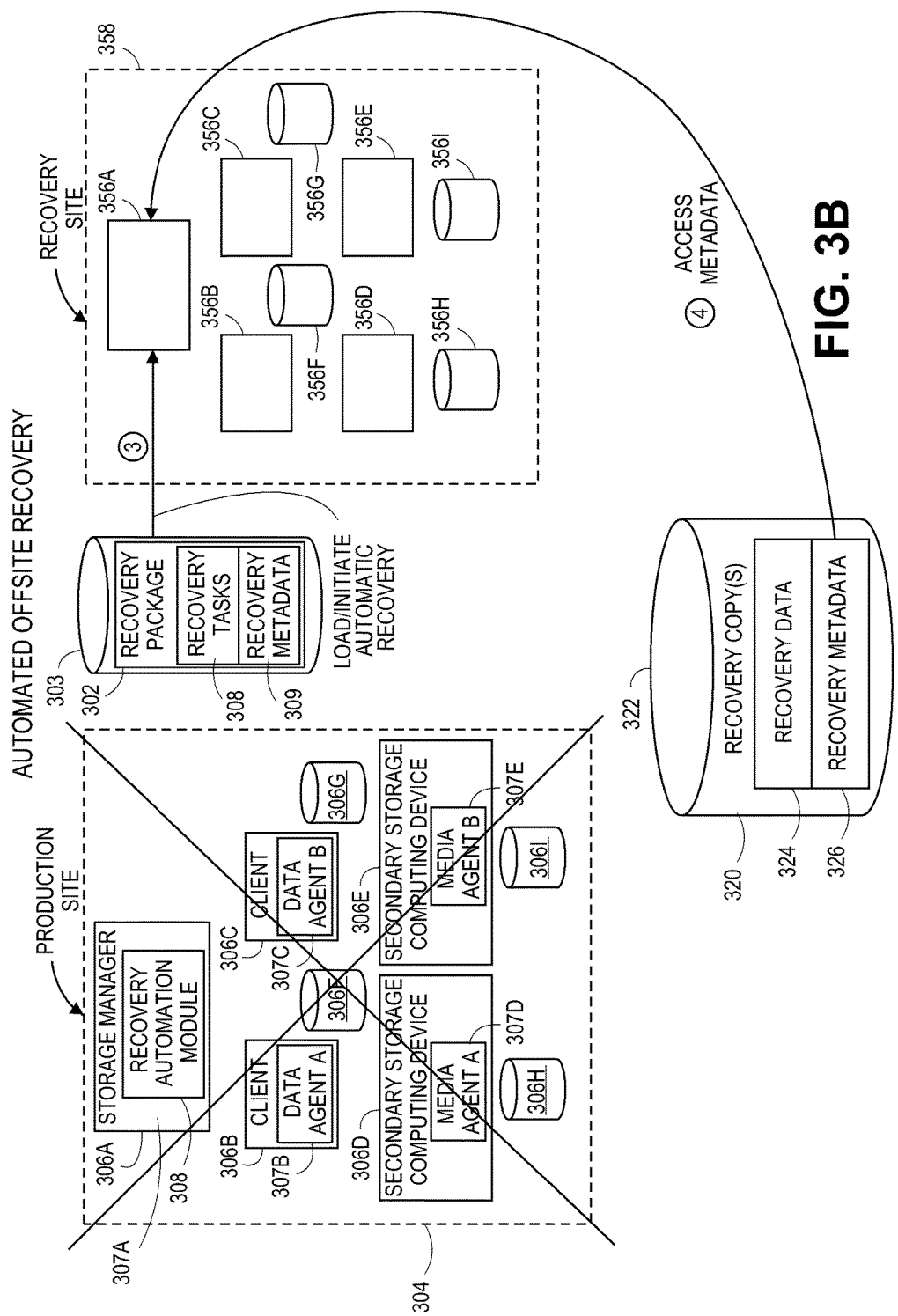
Figure 3C:
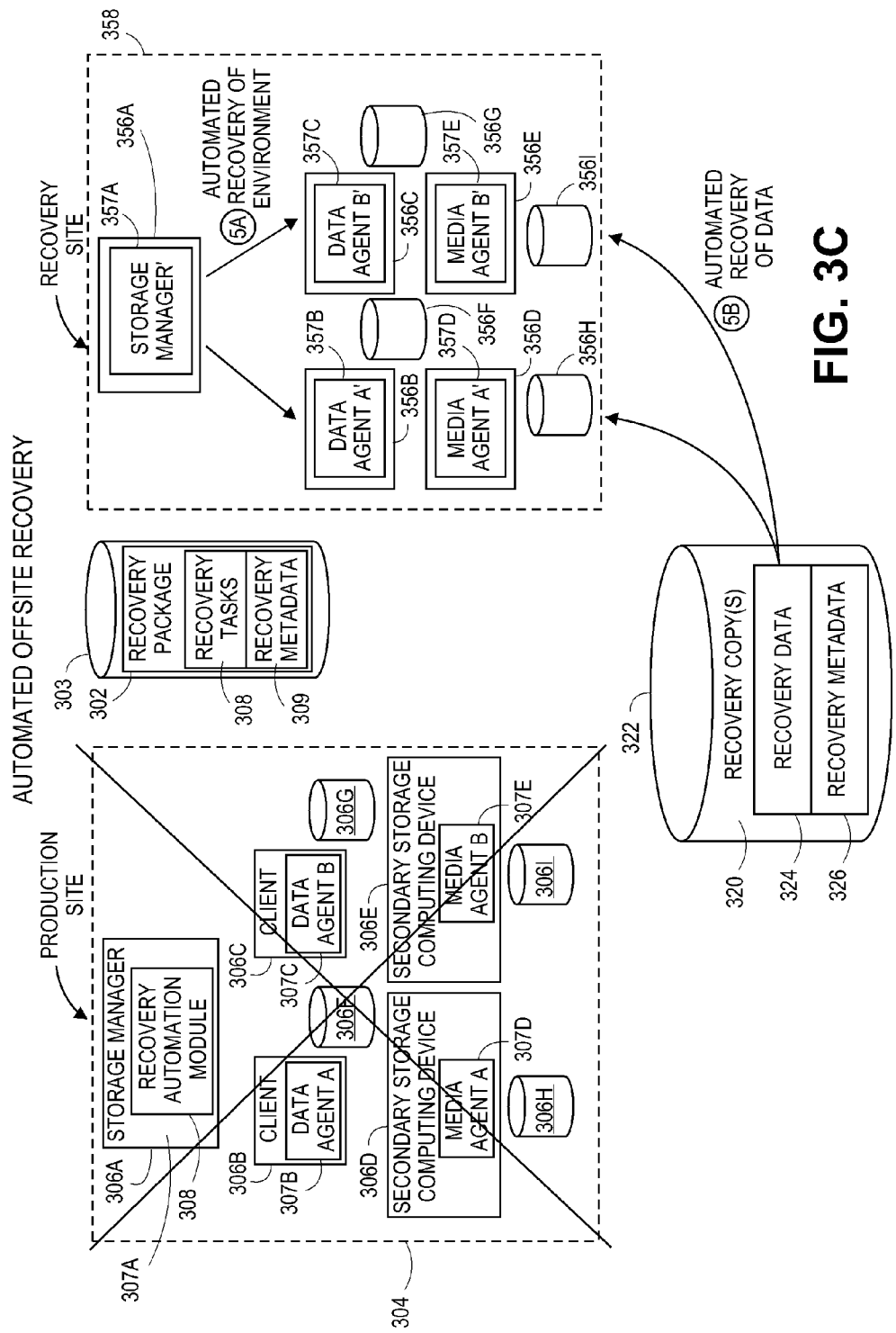

FIGS. 3A-3C illustrate the generation and execution of a recovery automation package 302 according to certain embodiments. Referring to FIG. 3A, in general, execution of the recovery package 302 implements the recovery of portions of a first, source data storage system 304 and/or data associated with the first data storage system 304. The first data storage system 304 is implemented on a first set of one or more computer hardware devices 306 at a production site. For instance, execution of the recovery package 302 may replicate the first data storage system 304 or portions thereof onto a second set of one or more computer hardware devices 356 to create a second data storage system 354. Moreover, execution of the recovery package 302 can restore data from the first data storage system 304 to one or more of the storage devices 356f-356i in the second data storage system 354. The second set of computer hardware devices 356 may reside at a recovery site or other location which that is physically remote from the production site, in certain embodiments.

The first set of computer hardware devices 306 can include one or more computing devices 306a-306e, such as the storage manager computing device 306a, the client computing devices 306b, 306c, and the secondary storage computing devices 306d, 306e, as well as one or more storage devices 306f-306i, which can include storage devices 306f, 306g for storing primary copies of production data and 306h, 306i for storing secondary copies of production data. The computing devices 306a-306e can include servers, desktop or laptop computers, mobile devices, other appropriate computing devices, depending on the particular system configuration. The storage devices 306f-306i can include any appropriate type of storage devices, such as tape libraries, magnetic media storage devices, optical media storage devices, solid state media storage devices, or any other suitable storage devices. The number and type of hardware devices 306 and data storage components can vary depending on the embodiment.

In addition, one or more data storage components 307a-307e reside on the computing devices 306a-306e. For instance, a storage manager module 307a, one or more data agents 307b, 307c and one or more media agents 307d, 307e, execute on the computing devices 307a-307e, respectively. In general, the data storage system 304 can be the same as or similar to the data storage system 350 described above with respect to FIG. 2. For instance, the computer hardware devices 306a-306e and the components 307a-307e can be similar to or the same as the corresponding similarly named components described with respect to FIG. 2, and can be arranged with respect to and communicate with one another in a similar manner. Thus, in some embodiments, the data storage devices 306f, 306g can comprise corresponding information stores that store primary production data generated by the client computing devices 306b, 306e, and can be similar to or the same as the information stores 390 of FIG. 2. Additionally, the data storage devices 306h, 306i can store secondary copies of the production data, similar to the storage devices 315 of FIG. 2.

At operational step 1, the recovery automation module 308 generates and/or outputs at least one recovery automation package 302. For instance, as described above with respect to FIG. 2, the user may interact with a GUI, command-line, word-processing, or other type of interface (not shown) to construct a recovery flow. Based on the user-constructed recovery flow, the recovery automation module 308 generates the recovery automation package(s) 302. For instance, the user may select a particular set of tasks for inclusion in the recovery flow(s).

Once the user designs the recovery flow, the automation module 308 creates the recovery package 302 for storage on storage media 303, which can be the storage media 323 described with respect to FIG. 2, for example. In one embodiment, the recovery automation module 308 accesses a data base containing code segments or other information associated with the selected tasks. The database can be the task database 327 shown in FIG. 2, for instance. The accessed code segments are combined together and otherwise processed to create a set of recovery tasks 308 for inclusion in the recovery package 302. In one embodiment, the set of recovery tasks 308 can include a sequential series of commands that can be parsed and/or processed by a computing device on which the recovery package 302 is invoked to carry out the associated tasks. The recovery tasks 308 are described further with respect to FIG. 5 below. In some cases, multiple recovery automation packages 302 are generated. For instance, the user may wish to create several automation packages 302 which are each designed to perform targeted recovery of different select portions of the data storage environment. As a first illustrative example, a user creates one automation package 302 for restoring a data base including the following recovery tasks 308: install storage manager; install media agent; install SQL data base; restore database. As another example, a user creates an automation package 302 for restoring a file system including the following recovery tasks 308: install storage manager; install media agent; install file system; restore file system. One or more separate automation packages may also be created for each of a plurality data storage environments (e.g., multiple production sites). Each recovery automation package 302 is stored as a separate file in some embodiments.

In some cases, an instance of the recovery automation module 308 is stored along with the recovery package 302 on the storage media 303. For instance, instance of the automation module 308 stored on the media 303 may be accessed for installation, e.g., at the recovery site, as part of the recovery process. In such a case, the user can install the automation module 308 and then use the GUI or other interface of the automation module to execute a desired automation package 302. As shown, the recovery package 302 in some embodiments also includes recovery metadata 309. The recovery metadata 309 is discussed in further detail herein, and can include configuration information that is used to recover the data storage system 304 (or portions thereof).

In some embodiments, the recovery package 302 does not include recovery metadata 309, and recovery metadata 326 is instead included in one or more recovery copies 320, which are discussed further below. In another configuration, the recovery package 302 and the recovery copy 320 both contain copies of identical recovery metadata. In other embodiments, the recovery package 302 includes a subset of the recovery metadata 326 contained in the recovery copy 320. For instance, the recovery metadata 309 in the recovery package 302 may include sufficient configuration parameters or other metadata 309 to initiate the recovery process, and the recovery copy 320 includes the remaining recovery metadata 326. In other cases, the recovery package 302 and the recovery copy 320 include some common metadata and some different metadata. The recovery metadata 326 can include configuration information related to the source system 304. As an example, a database (not shown) associated with the storage manager module 307a may include the configuration information, and the configuration information is included in the recovery copy 322 (e.g., a backup copy).

The configuration information can generally include information sufficient to rebuild the source storage system 304, and can include, but is not limited to, information specifying the number, type and arrangement of the various components in the source storage system 304. For instance, the configuration information can include a number of client computing devices 306b, 306c and associated data agents 307b, 307c, type of data agents 307b, 307c (e.g., file system data agent, Exchange data agent, or the like), number and type of secondary storage computing devices 306d, 306e and associated media agents 307d, 307e, number and type of primary storage devices 306f, 306g, number and type of secondary storage devices 306h, 306i. The configuration information can further include topology information indicating how the various components are connected to one another, settings or parameters associated with one or more of the components, among other types of information.

While the configuration information can in some embodiments include information sufficient to rebuild the entire source storage system 304, the recovery tasks 308 may in some cases only include instructions for rebuilding a subset of the source storage system (e.g., one or more critical components).

At operational step 2, the data storage system 304 creates one or more recovery copies 320, which can be stored on one or more storage devices 322. For instance, each recovery copy includes recovery data 324 that can correspond to production data generated by one or more applications running on the client computing devices 306b, 306c. As a few examples, the recovery data 324 and/or recovery data 324 can include backup copies, snapshot copies, replication copies, auxiliary copies, or copies of any of these, depending on the embodiment. In some embodiments, the recovery copy 320 is dedicated for recovery purposes.

The storage device(s) 322 that store the one or more recovery copies 320 is preferably physically remote from the data storage system 304 or components thereof. This can decrease the likelihood that a disaster or other event affecting the integrity of the data storage system 304 will also affect the integrity of the storage device(s) 322.

While the creation of the recovery copy(s) 320 is illustrated as occurring after the creation of the recovery package, the two operations could occur in reverse order or in overlapping fashion, depending on the embodiment. For instance, the data storage system 304 may create the recovery copies 320 on a scheduled basis, according to a storage policy, while the timing of the creation of the recovery package 302 may occur intermittently, depending on user action. In one embodiment, a recovery copy is automatically generated upon creation of a recovery package 302. In this way, the recovery copy 320 can closely reflect the data storage system 304 as it existed at the time the recovery package 302 was created. In order to track the association between recovery packages 302 and corresponding recovery copies 320, one or more of the recovery package 302 and the corresponding recovery copy 320 can include an identifier indicative of the association (e.g., a unique alphanumeric identifier). In this way, upon execution of the recovery package 302, the corresponding recovery copy 320 can be identified and used in the recovery.

Referring to FIG. 3B, a disaster or other event has occurred at the production site. The integrity of data storage system 304 has been compromised, as indicated by the "X", resulting in a loss of data and/or failure of components in the data storage system 304. In order to begin the recovery process, the recovery package 302 is invoked at operational step 3 by a first computing device 356a located at the recovery site. For instance, as just one example, a company employee may travel to the recovery site and access the computing device 356a. The employee may use the computing device 356a to load the recovery package 302 from a thumb drive or other portable memory device, or may access the recovery package 302 from remote storage (e.g., cloud storage) using the computing device 356a. For instance, where an instance of the automation module 308 is stored along with the recovery package 302 on the media 303, the user may install the automation module 308 on the computing device 356a or another computing device at the recovery site, and then invoke a selected automation package 302 via GUI of the automation module 308. In other cases, the computing device used to invoke the recovery package 302 is not located at the remote site. For instance, an employee may invoke the recovery package 302 using a computing device (not shown) that is in networked communication with, but physically remote from, the computing devices 356 at the recovery site.

Once the recovery package 302 is invoked, the first computing device 356a begins to execute the recovery tasks 308 to carry out the recovery process. In some embodiments, for example, after the user invokes the recovery package 302, the recovery process completes without further human involvement. In one configuration, the recovery package 302 includes a software module (not shown) that is installed on the first computing device 356a when the data recovery package 302 is invoked, and the software module manages the execution of the recovery tasks 308. The software module may include a GUI or other user interface that allows the user to launch the recovery process.

As discussed, in some embodiments, recovery metadata 309 is included in the recovery copy 320. In some cases, execution of the recovery package 302 causes the computing device 356a to access the storage device(s) 322 to retrieve the recovery metadata 326. As discussed, the recovery metadata 326 includes configuration data usable to reconstruct portions of the data storage system 304. For instance, the recovery metadata 326 in one embodiment includes an index, database, or other data structure including information related to the configuration of the first data storage system 304. Such data can include, without limitation, the number of the different types of components 307 in the first data storage system 304, configuration parameters related one or more of the individual components 307, the topology and/or connectivity of the components with respect to one another, and the like. Such information can be included for any of the components in the first data storage system 304, including the clients, data agents, secondary storage computing devices, media agents, computing devices, storage devices, or other components, for example. Recovery metadata 326 is discussed in further detail with respect to FIGS. 4 and 5.

As discussed, in other embodiments, the recovery copy 320 may not include recovery metadata, or may include only a portion of the recovery metadata. In such cases, the first computing device 356a may access recovery metadata 309 included in the recovery package 302 instead of, or in addition to, accessing the recovery metadata 326 contained in the recovery copy 320.

The first computing device 356a continues to execute the pre-configured data recovery tasks 308 that define the recovery workflow. In the illustrated embodiment, referring now to FIG. 3C, execution of the data recovery package 302 causes the first computing device 356a at operational step 5A to replicate the components of the first data storage system 304 onto the second set of computer hardware devices 356. For instance, the first computing device 356a installs replicated versions 357a-357e of the storage manager, data agent A, data agent B, media agent A and media agent B 307a-307e on the computing devices 356a-356e in the second set of computer hardware devices 356. In some embodiments, the first computing device 356a utilizes the recovery metadata 326 accessed from the recovery copy 320 in installing and/or configuring the replicated versions 357a-357e of the various components. In other embodiments, the first computing device 356a utilizes the recovery metadata 309 included in the recovery package 302 instead of, or in addition to, the recovery metadata 326 from the recovery copy 320. While the first computing device 356a in the illustrated embodiment is used to both execute the recovery package 302 and host the storage manager' 357a, separate computing devices can be used in other embodiments.

The recovery package 302 may define additional steps in recovering the data storage environment. For instance, operating system configuration information for one or more of the computing devices 306a-306e in the first set of computer hardware devices 306 may be included in the recovery metadata. This operating system configuration information may be replicated to one or more of the computing devices 357a-357e in the second set of computer hardware devices 356, or otherwise utilized in the recovery process. In one embodiment, Windows Registry information from the computing device 306a that hosts the storage manager 307a in the first data storage environment is copied to the computing device 356a that hosts the storage manager' 357a in the recovered data storage environment 358. In some embodiments, other types of programs can be installed on one or more of the computing devices 357a-357e. For instance, the recovery package 302 may specify that a database program (e.g., SQL) be installed on one or more of the computing devices 357a-357e. In some embodiments, the recovery package 302 includes tasks for installing a file system on the one or more of the computing devices 357a-357e. And the recovery package 302 can also include tasks for restore data to the installed components. For instance, the recovery package 302 can include tasks for restoring files and/or directories to the installed file system, or for restoring data to the installed database program. Whatever the type of data, the tasks for restoring the data may cause one or more computing devices 357a-357e at the recovery site to access the recovery data 324 from the recovery copy stored on the storage device(s) 322.

At operational step 5B, recovery data 324 included in the recovery copy 320 is automatically restored to the recovery site. For instance, depending on the embodiment, one or more of the recovery tasks 308 in the recovery package 302 may cause the recovery data 324 or a portion thereof be copied to the data storage devices 356f, 356g that are in communication with the clients 356b, 356c to restore primary production data. Moreover, the recovery data 324 or a portion thereof can also be copied to storage devices 356h, 356i that are in communication with the media agents 357d, 357e, e.g., as secondary copies.

Figure 4:
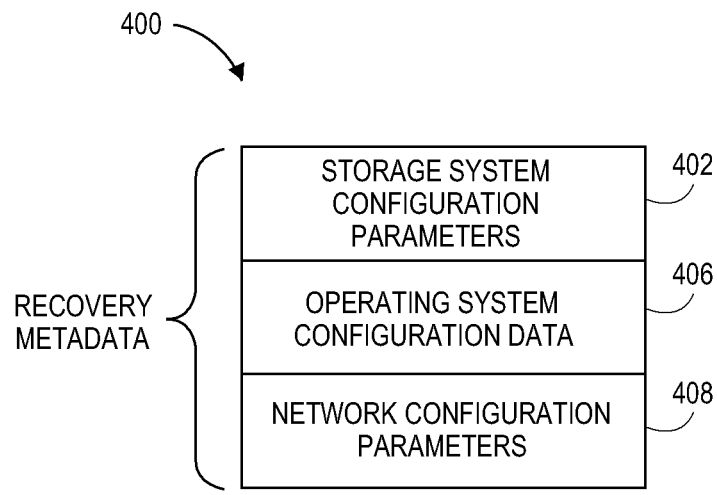
FIG. 4 illustrates example recovery metadata that can be used to recover a data storage environment or portions thereof.

FIG. 4 shows example recovery metadata 400, which can include, without limitation, storage system configuration parameters 402, operating system data 406, and network configuration parameters 408.

As discussed, the storage system configuration parameters 402 can include information associated with the components in the source data storage system 304 (e.g., the number and type of the components, configuration parameters for one or more of the components, topology or connectivity of the components, etc.). In one embodiment, a database (e.g., a Microsoft SQL Server database) maintains this information. Referring to FIGS. 3A-3C again, the database in one embodiment is copied to the storage device 322 for inclusion in the recovery metadata 326 associated with the recovery copy 320.

Information related to the configuration of the source data storage system 304 may be embedded in operating system level information associated with one or more of the computing devices 306a-306e in the source data storage system 304. As such, the recovery metadata 400 can further include certain operating system data related to at least one of the computing devices 306a-306e. In one embodiment, the Windows Registry database for one or more of the computing devices 306a-306e, such as the computing device 306a on which the storage manger 307a resides, is included in the recovery metadata 400. In other embodiments, such as where Linux or Unix are used, the operating system data 406 can include plain text files with operating system configuration information.

In certain embodiments, such as where a firewall exists between certain components in the source data storage system, the recovery metadata 400 can further include network configuration parameters 408. For instance, referring to FIGS. 3A-3C again, in certain configurations a firewall exists between one or more of the client computing devices 306b,306c and the storage manager computing device 306a, or between one or more of the media agent computing devices 306d, 306e and the storage manager computing device 306a. In such cases, the network configuration parameters 308 can include firewall configuration files from the source data storage system 304. The firewall configuration files may be replicated to the destination data storage system 358 during as part of the restore process in order to reconstruct the network configuration of the source data storage system 304.

Figure 5:
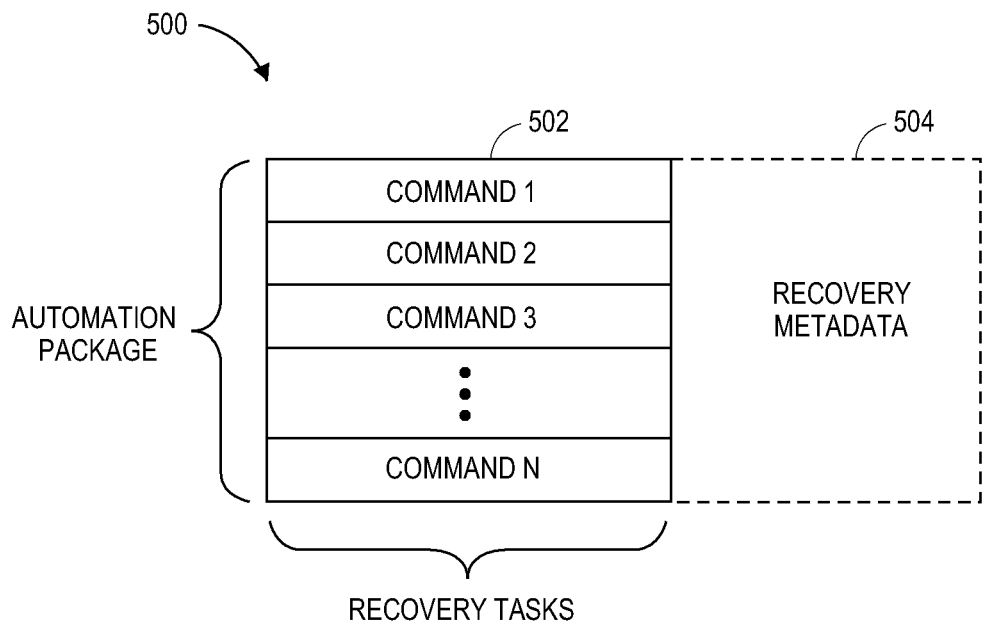
FIG. 5 illustrates an example recovery automation package.

FIG. 5 shows an example recovery automation package 500. The recovery automation package includes a set of recovery tasks or commands 502, which can be arranged in order of execution. The commands 502 can include code segments or executable instructions and, when executed in order, are configured to perform the recovery process to completion in an automated fashion, e.g., without human intervention. The automation package 500 can further include recovery metadata 504, which can include any of the recovery metadata described herein. While shown separately from the recovery tasks 502, the recovery metadata can be integrated with or otherwise associated with certain commands. For instance, recovery metadata may be used as parameters for or inputs to certain commands.

While the hypothetical situation described with respect to FIGS. 3A-3C involves an actual disaster or other event impairing the source data storage system 304, similar automated recovery techniques could be used for testing or compliance purposes, where no such event actually occurred.

In addition, the example described with respect to FIGS. 3A-3C involves recovering data and/or replicating the source data storage system 304 to a separate, remote recovery site, onto separate computer hardware 356. However, in some other scenarios, a similar automated recovery technique can be used to restore data to the source data storage system 304, or to rebuild portions of the source data storage system 304 on one or more of the first computer hardware devices 306. For instance, one or more of the components 307 in the first data storage system 304 may become corrupted, while the corresponding underlying computing device is still operational. In such a case, the recovery package may implement the re-installation of the corrupted component on the original computing device. Moreover, copies of production data (e.g., primary or secondary copies of production data) in the first data storage system 304 may become corrupted, while the underlying storage media remains operational or repairable. Under these circumstances, the recovery package may restore the data to the to the same storage media to replace the corrupted copies of the data. In yet further scenarios, a subset of one or more of the hardware devices 306 at the production site are impaired, while the remaining devices remain operational. In such cases, the recovery techniques can be used to selectively recover the source data storage system 304 to one or more additional hardware devices, leaving the operational portions of the system 304 intact. The additional hardware devices can be either local to or remote from the first set of hardware devices, as desired.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of automating recovery of a networked data storage environment, the method comprising:

accessing, using a first computing device that is remote from a second computing device, an automated data recovery package located in storage associated with the second computing device, the automated data recovery package generated by the second computing device; and executing the automated data recovery package using the first computing device, wherein said executing the automated data recovery package comprises:

installing on at least one computing device of a first set of computer hardware devices an instance of one or more secondary storage controllers that were installed on at least one computing device of a second set of computer hardware devices, wherein the instance of the one or more secondary storage controllers is configured to manage data storage operations between one or more client computing devices of the first set of computer hardware devices and one or more secondary storage devices of the first set of computer hardware devices, copying at least a portion of a data store associated with the second set of computer hardware devices to one or more storage devices associated with the first set of computer hardware devices, the data store including a copy of data that was generated by one or more applications executing on one or more client computing devices of the second set of computer hardware devices, and installing a storage manager on a computing device of the first set of computer hardware devices, the storage manager configured, for a given data storage operation, to instruct at least one of the one or more secondary storage controllers to manage the given data storage operation.

2. The method of claim 1, wherein the first set of computer hardware devices are remote from the second set of computer hardware devices.

3. The method of claim 1, wherein said executing the automated data recovery package is executed to completion without human intervention.

4. The method of claim 1, wherein the automated data recovery package includes configuration parameters associated with the instance of the one or more secondary storage controllers, and wherein the configuration parameters are utilized to automatically configure the instance of the one or more secondary storage controllers installed on the at least one computing device of the first set of computer hardware devices.

5. The method of claim 1, wherein a copy of configuration parameters associated with the one or more secondary storage controllers are stored remotely from the second set of computer hardware devices, and
wherein said executing the automated data recovery package further comprises:
accessing the copy of the configuration parameters, and
automatically configuring the instance of the one or more secondary storage controllers installed on the at least one computing device of the first set of computer hardware devices based at least in part on the copy of the configuration parameters.

6. The method of claim 1, wherein the automated data recovery package is generated by:
accessing a database including executable versions of a set of available commands;
extracting from the database executable versions of selected commands from the set of available commands; and
assembling the extracted executable versions to form the automated data recovery package.

7. The method of claim 6, wherein the automated data recovery package comprises code segments, each of the code segments corresponding to one of the selected commands.

8. A computer system, comprising:
one or more computer processors;
a non-transitory computer-readable storage medium having computer-executable instructions stored thereon that when executed by the one or more computer processors, cause the one or more computer processors to:
access an automated data recovery package stored on storage associated with a first computing device, wherein the automated data recovery package is generated by the first computing device; and
execute the automated data recovery package, wherein execution of the automated data recovery package causes the one or more computer processors to:
install on at least one computing device of a first set of computer hardware devices an instance of one or more secondary storage controllers that were installed on at least one computing device of a second set of computer hardware devices, wherein the instance of the one or more secondary storage controllers is configured to manage data storage operations between one or more client computing devices of the first set of computer hardware devices and one or more secondary storage devices of the first set of computer hardware devices,
copy at least a portion of a data store associated with the second set of computer hardware devices to one or more storage devices associated with the first set of computer hardware devices, the data store including a copy of data that was generated by one or more applications executing on one or more client computing devices of the second set of computer hardware devices, and
install a storage manager on a computing device of the first set of computer hardware devices, the storage manager configured, for a given data storage operation, to instruct at least one of the one or more secondary storage controllers to manage the given data storage operation.

9. The computer system of claim 8, wherein the first set of computer hardware devices are remote from the second set of computer hardware devices.

10. The computer system of claim 8, wherein the computer-executable instructions cause the one or more computer processors to execute the automated data recovery package to completion without human intervention.

11. The computer system of claim 8, wherein the automated data recovery package includes configuration parameters associated with the instance of the one or more secondary storage controllers, and wherein the execution of the automated data recovery package, further causes the one or more computer processors to configure the instance of the one or more secondary storage controllers installed on the at least one computing device of the first set of computer hardware devices based at least in part on the configuration parameters.

12. The computer system of claim 8, wherein a copy of configuration parameters associated with the one or more secondary storage controllers are stored remotely from the second set of computer hardware devices, and
wherein the execution of the automated data recovery package, further causes the one or more computer processors to:
access the copy of the configuration parameters, and
automatically configure the instance of the one or more secondary storage controllers installed on the at least one computing device of the first set of computer hardware devices based at least in part on the copy of the configuration parameters.

13. The computer system of claim 8, wherein to generate the automated data recovery package, the first computing device is configured to:
access a database including executable versions of a set of available commands;
extract from the database executable versions of selected commands from the set of available commands; and
assemble the extracted executable versions to form the automated data recovery package.

14. The computer system of claim 13, wherein the automated data recovery package comprises code segments, each of the code segments corresponding to one of the selected commands.

15. A computer-readable, non-transitory storage medium comprising computer-executable instructions that when executed by one or more computer processors cause the one or more computer processors to:
access an automated data recovery package stored on storage associated with a first computing device, wherein the automated data recovery package is generated by the first computing device; and
execute the automated data recovery package, wherein execution of the automated data recovery package causes the one or more computer processors to:
install on at least one computing device of a first set of computer hardware devices an instance of one or more secondary storage controllers that were installed on at least one computing device of a second set of computer hardware devices, wherein the instance of the one or more secondary storage controllers is configured to manage data storage operations between one or more client computing devices of the first set of computer hardware devices and one or more secondary storage devices of the first set of computer hardware devices, copy at least a portion of a data store associated with the second set of computer hardware devices to one or more storage devices associated with the first set of computer hardware devices, the data store including a copy of data that was generated by one or more applications executing on one or more client computing devices of the second set of computer hardware devices, and install a storage manager on a computing device of the first set of computer hardware devices, the storage manager configured, for a given data storage operation, to instruct at least one of the one or more secondary storage controllers to manage the given data storage operation.

16. The computer-readable, non-transitory storage medium of claim 15, wherein the first set of computer hardware devices are remote from the second set of computer hardware devices.

17. The computer-readable, non-transitory storage medium of claim 15, wherein the computer-executable instructions cause the one or more computer processors to execute the automated data recovery package to completion without human intervention.

18. The computer-readable, non-transitory storage medium of claim 15, wherein the automated data recovery package includes configuration parameters associated with the instance of the one or more secondary storage controllers, and wherein the execution of the automated data recovery package, further causes the one or more computer processors to configure the instance of the one or more secondary storage controllers installed on the at least one computing device of the first set of computer hardware devices based at least in part on the configuration parameters.

19. The computer-readable, non-transitory storage medium of claim 15, wherein a copy of configuration parameters associated with the one or more secondary storage controllers are stored remotely from the second set of computer hardware devices, and wherein the execution of the automated data recovery package, further causes the one or more computer processors to:

access the copy of the configuration parameters, and automatically configure the instance of the one or more secondary storage controllers installed on the at least one computing device of the first set of computer hardware devices based at least in part on the copy of the configuration parameters.

20. The computer-readable, non-transitory storage medium of claim 15, wherein the automated data recovery package comprises code segments.

* * * * *